Figure 1:
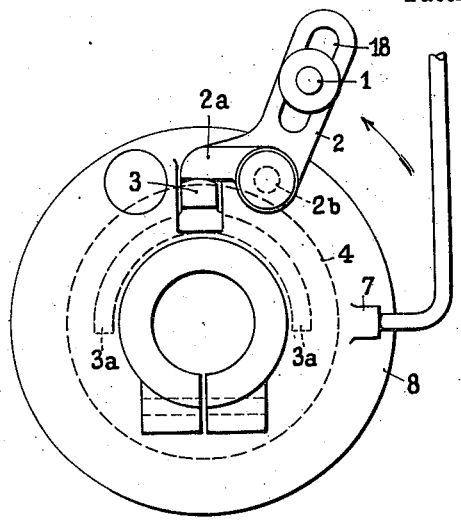

M. ROCKSTROH.
DEVICE FOR MEASURING AND RECORDING THE POWER CONSUMPTION OF MACHINES.
APPLICATION FILED OCT. 23, 1920.

1,429,165.

Patented Sept. 12, 1922.
2 SHEETS—SHEET 1.

Witnesses:

Inventor:
Max Rockstroh

M. ROCKSTROH.
DEVICE FOR MEASURING AND RECORDING THE POWER CONSUMPTION OF MACHINES.
APPLICATION FILED OCT. 23, 1920.

1,429,165.

Patented Sept. 12, 1922.
2 SHEETS—SHEET 2.

Witnesses:

Inventor:
Max Rockstroh

Patented Sept. 12, 1922.

1,429,165

UNITED STATES PATENT OFFICE.

MAX ROCKSTROH, OF KLEIN-SEDLITZ, NEAR PIRNA, GERMANY.

DEVICE FOR MEASURING AND RECORDING THE POWER CONSUMPTION OF MACHINES.

Application filed October 23, 1920. Serial No. 419,124.

*To all whom it may concern:*

Be it known that I, MAX ROCKSTROH, subject or citizen of the German Republic, residing at Villa Lutzou, Klein-Sedlitz, near Pirna, Germany, have invented certain new and useful Improvements in Devices for Measuring and Recording the Power Consumption of Machines, of which the following is a specification.

My invention relates to a device for indicating and recording the power or output of a machine tool, and appertains to that type of these devices in which there is interposed an engaging member between the driving member e. g. a belt pulley, and the driving part e. g. a shaft; said engaging member producing an axial motion corresponding to the torque, the extent of which axial motion is transmitted to an indicating mechanism.

It is an object of my invention to produce a device by means of which the person operating the machine tool may at any moment ascertain whether the machine is working satisfactorily. The device is further destined to graphically indicate by means of a curve whether the machine has been worked to utmost capacity during the working period.

The latter object is achieved by means of levers which serve to transmit the torque from the driving pulley to a spring. The co-acting arms of the levers are so curved and correlated that the effective leverage will automatically change according as the torque increases or diminishes, the arms $2^a$ and 3 being longer when subjected to a light torque and therefore exerting relatively greater leverage on the spring than is the case under a heavy torque. The pressure lever may be curved in shape, so that for instance, a spring weighing 45 kilograms will not only effect or act upon pressures lying between 35 and 55 kilograms but will also react on such pressures weighing between 10 and 70 kilograms, owing to the very fact that the leverage automatically changes in accordance with the torque.

An embodiment of the subject matter of my invention is disclosed by way of example in the drawings annexed to this specification and forming a part thereof.

Figure 2:
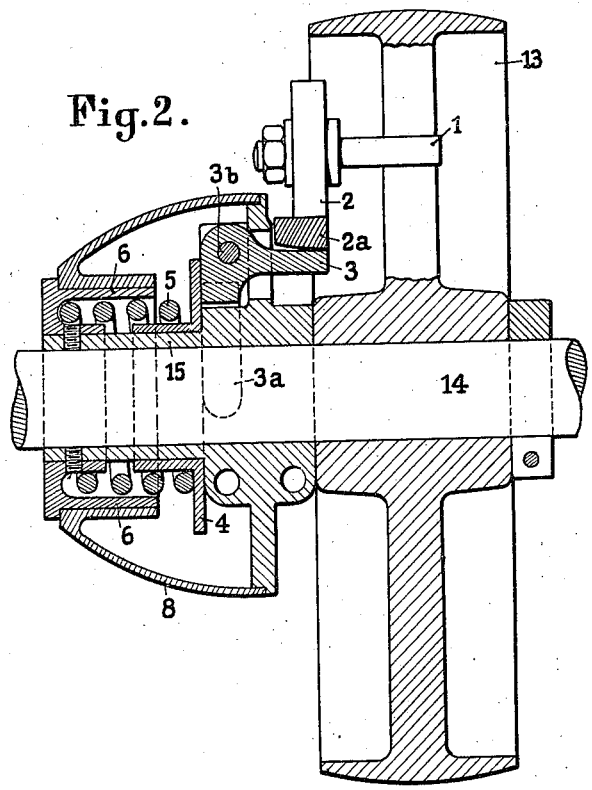
Figure 3:
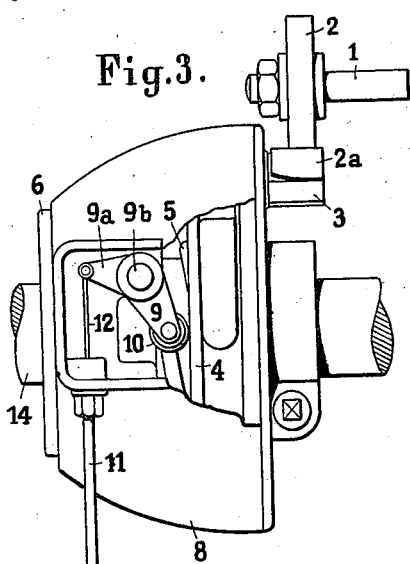
Figure 4:
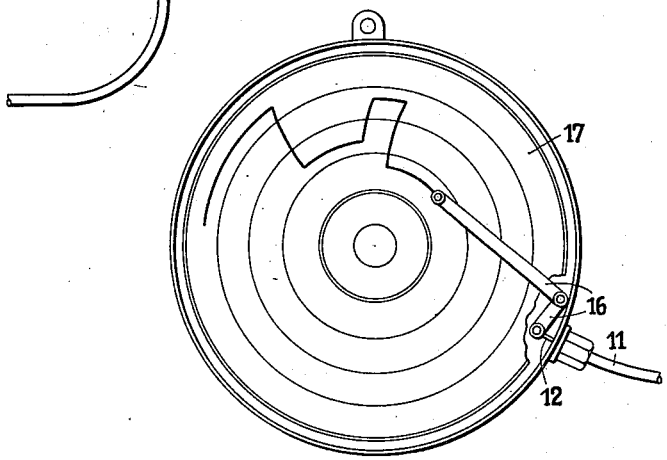

Fig. 1 is a diagrammatic view of the device as seen from the side of the catch member, Fig. 2 is a longitudinal section through the device, Fig. 3 is a diagrammatic view showing the device from the side where the power is taken up, and Fig. 4 shows a diagrammatic view of the recording mechanism.

Referring to these drawings: The catch bolt 1, which is adapted to engage the spokes of the driving pulley 13 mounted to rotate on the shaft 14, is movably arranged within a slot 18 formed in the catch lever 2. This latter oscillates around the pivot $2^b$, one i. e. $2^a$, of the limbs of which serves for the transmission of the power and is suitably rounded off or curved. The lever 2, $2^a$ is adapted to act on one of the limbs 3 of a lever 3, $3^a$, pivotally disposed at $3^b$; whereas the other limb $3^a$ is forked and in its turn acts on a collar 4. This collar is mounted so as to be axially displaceable on a main sleeve 15. rigidly connected with the shaft 14, and is moreover subjected to the action of a spring 5. The spring 5 bears up within a recessed collar 6, rigidly connected with the sleeve 15. The collar 6 forms a guide for a non-rotatable protective globe 8 secured by a journal 7, and serving to keep out the dust.

This said globe 8 is provided with a pivot $9^b$ on which a two-armed lever 9, $9^a$ is arranged; one arm, i. e. 9, of which takes up the axial motion of the slide collar 4 by intervention of a roller 10, whereas the other arm, i. e. $9^a$, of said levers transmits the motion thus taken up on to the connecting rods 16 of the recording mechanism 17 by aid of a wire cord 12 disposed within a steel wire spiral 11.

What I claim is:

1. An apparatus of the class described, comprising, in combination, a rotatable driving element, a shaft, a longitudinally movable collar on said shaft, spring means for yieldingly maintaining the collar in normal position, and mechanism interposed between said driving element and collar for moving the latter longitudinally in opposition to said spring means, said mechanism including means for exerting relatively greater leverage on said collar for lighter values of the turning moment exerted by said driving element upon said mechanism.

2. An apparatus of the class described, comprising, in combination, a rotatable driving element, a shaft, a longitudinally movable collar mounted on said shaft, spring means for yieldingly maintaining the collar in normal position, co-acting levers interposed between said element and collar, one of said levers being adapted to transmit the torque of said driving element to an arm of the other lever, the other arm of the latter bearing against and tending to move said collar in opposition to said spring means, whereby said collar is moved in accordance with the turning moment exerted by said driving element.

3. An apparatus of the class described comprising, in combination, a rotatable driving element, a shaft, a longitudinal movable collar mounted on said shaft, spring means for yieldingly maintaining the collar in normal position, co-acting levers interposed between said element and collar for moving the latter longitudinally in opposition to said spring means in accordance with the turning moment exerted by said driving element, a recording instrument, and devices actuated by the longitudinal movements of said collar for operating said instrument.

4. An apparatus of the class described comprising, in combination, a rotatable driving element, a shaft, a longitudinal movable collar mounted on said shaft, spring means for yieldingly maintaining the collar in normal position, levers interposed between said element and collar having co-acting arms so arranged that the leverage acting on said collar automatically changes according as the torque exerted by said driving element increases or decreases, a recording instrument, and devices actuated by the longitudinal movements of said collar for communicating motion to said instrument.

In testimony whereof I have hereunto set my hand in presence of two subscribing witnesses.

MAX ROCKSTROH.

Witnesses:
 WOLDEMAR DOEING,
 WILHELM GENERSDORF.